W. P. DUN LANY.
COIN CHANGE MAKING MACHINE.
APPLICATION FILED JULY 18, 1913.

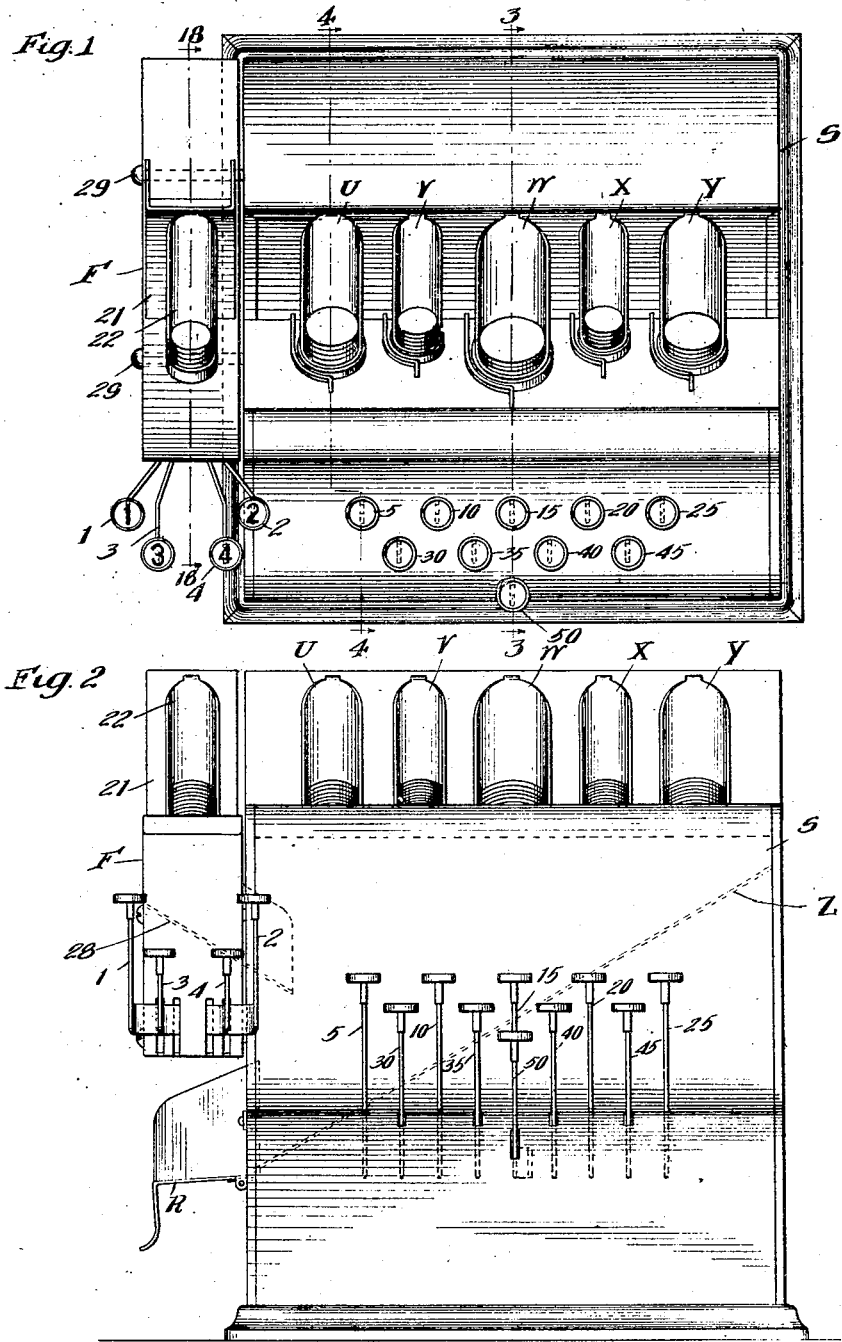

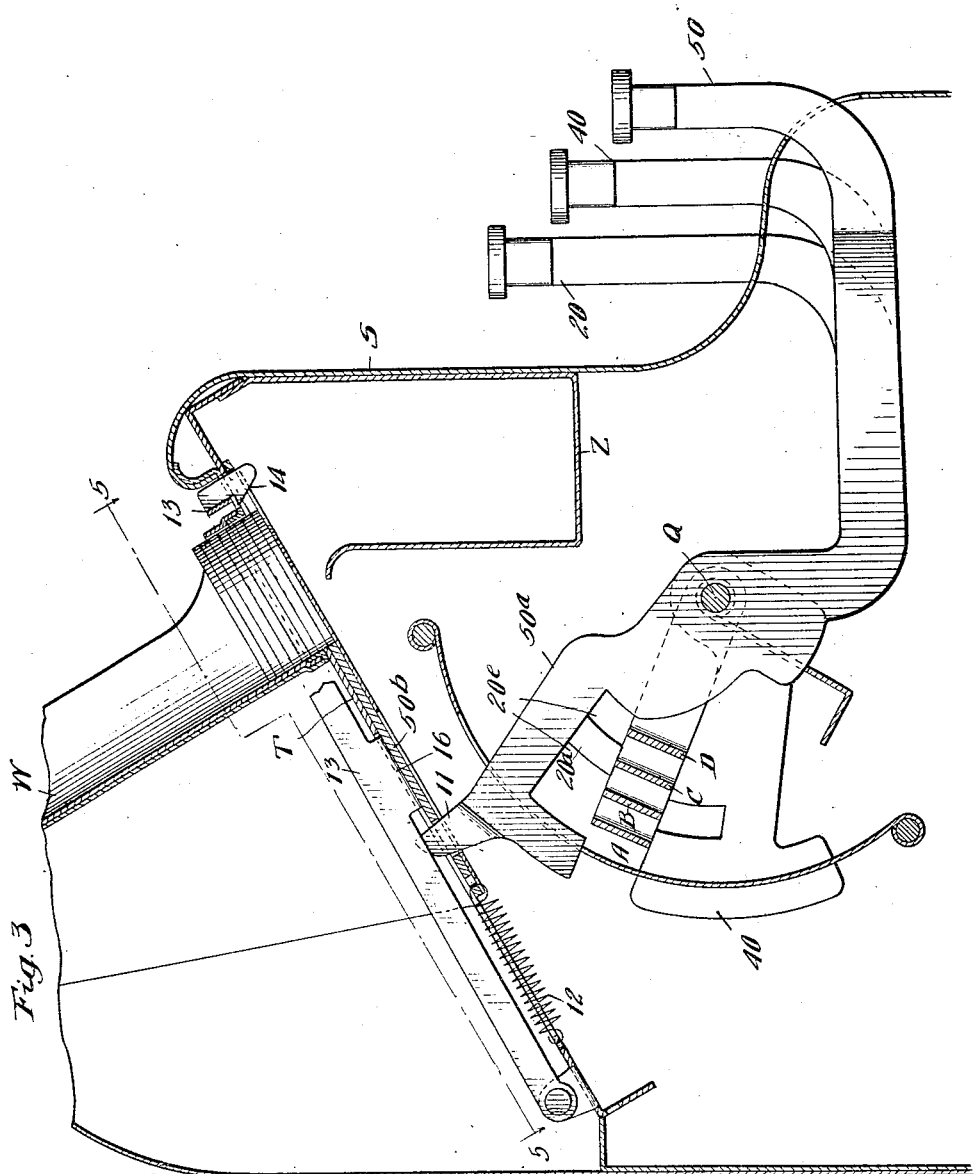

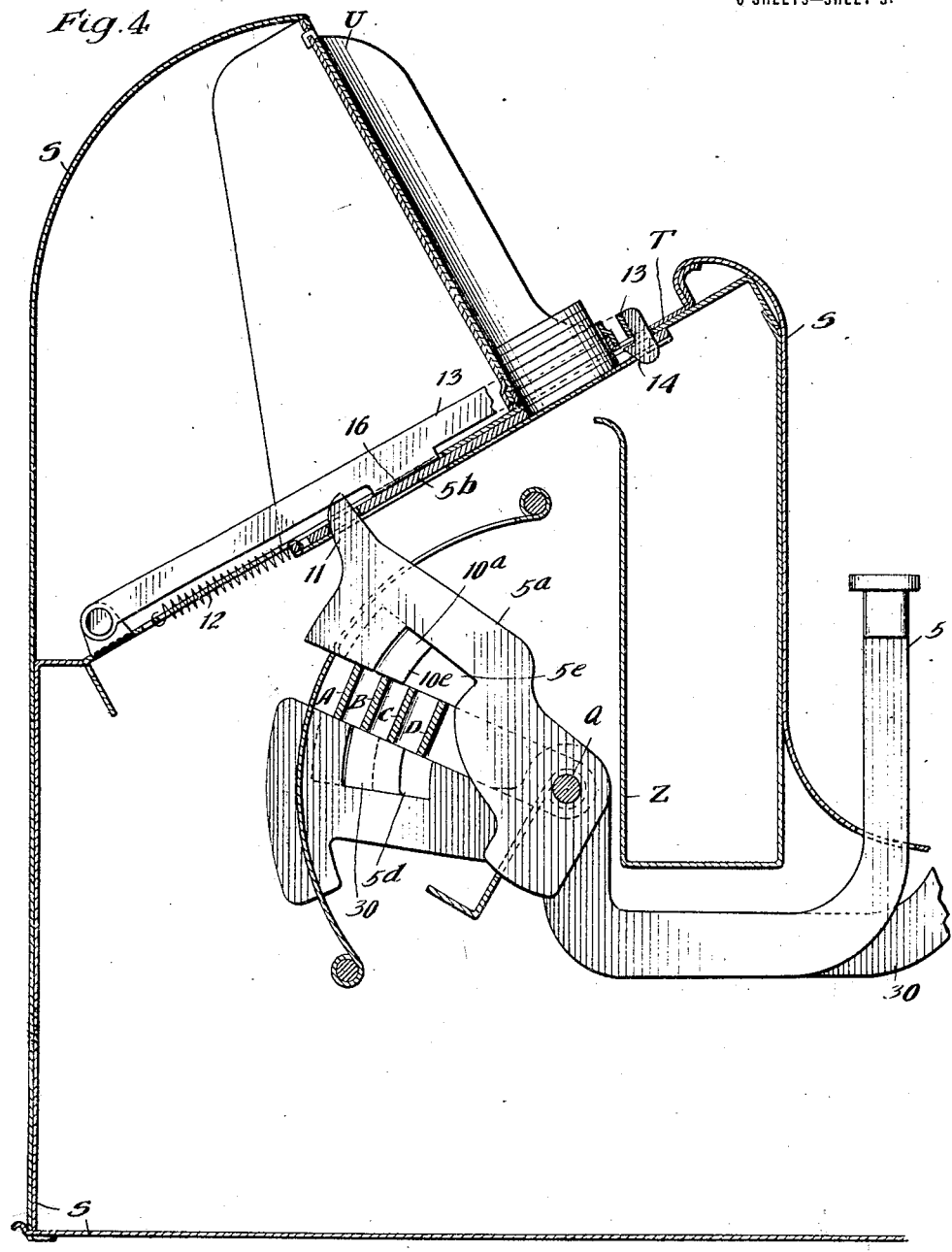

1,284,619.

Patented Nov. 12, 1918.
6 SHEETS—SHEET 4.

Witnesses:
Wm. Geiger
Esther Abrams

By

Inventor:
William P. Dun Lany
Munday, Evarts, Adcock & Clarke
Attys

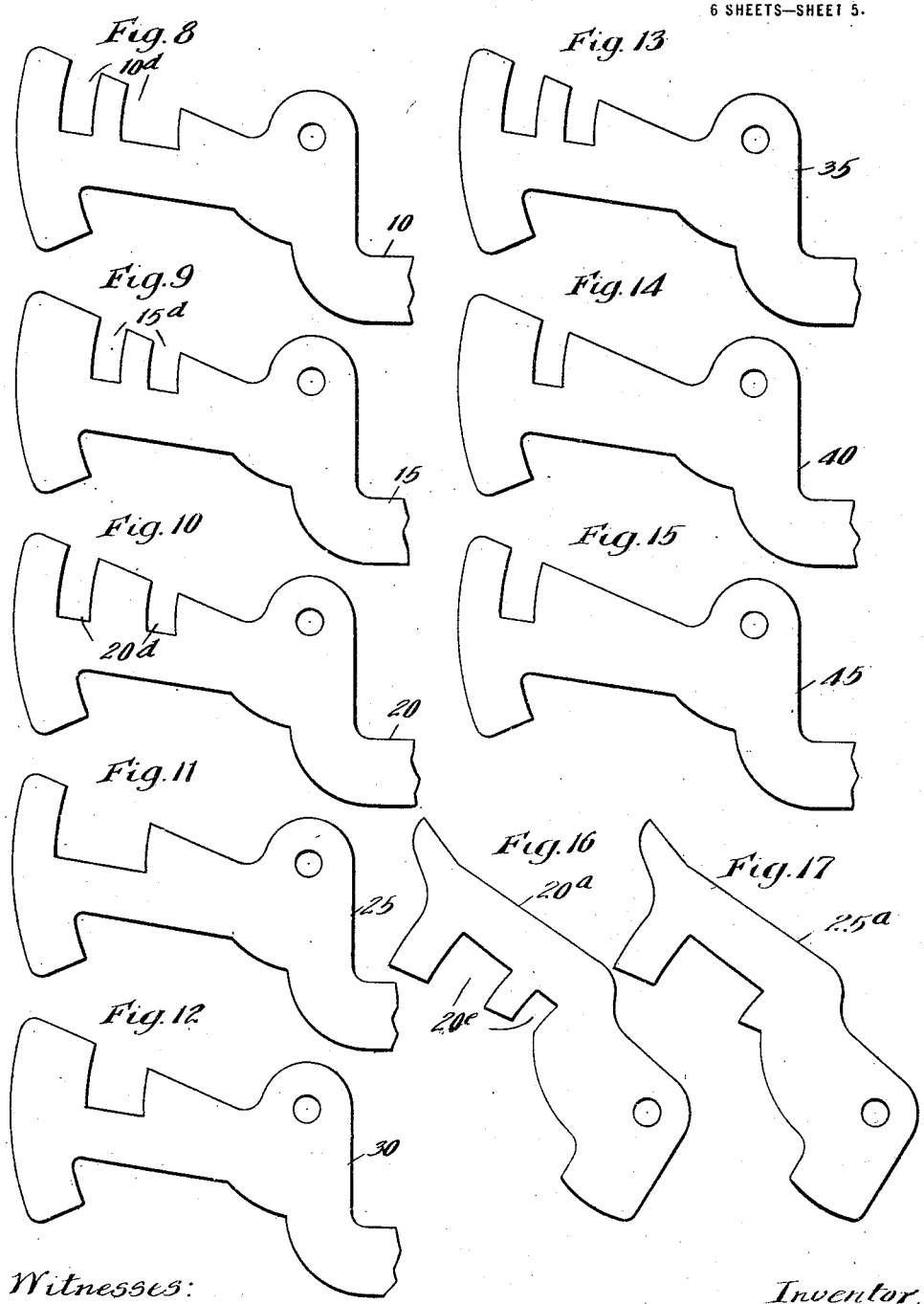

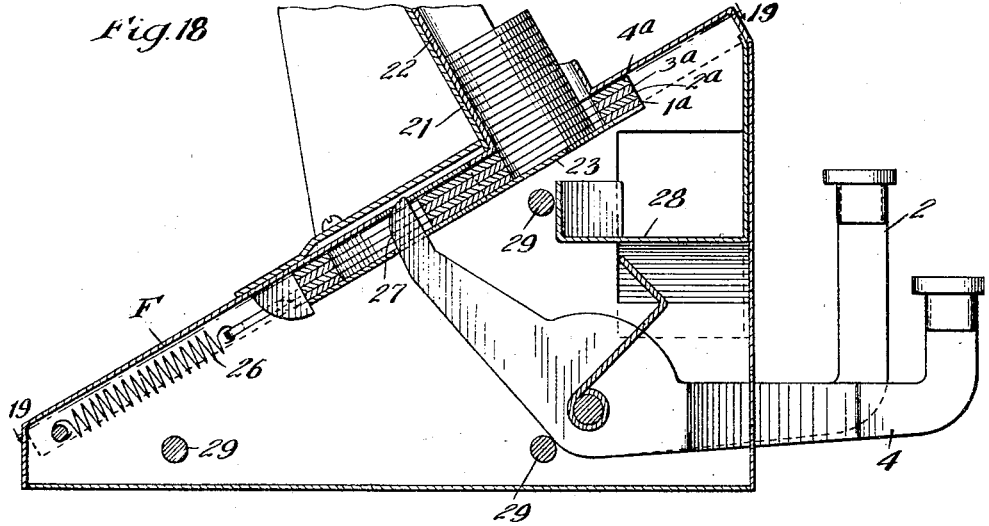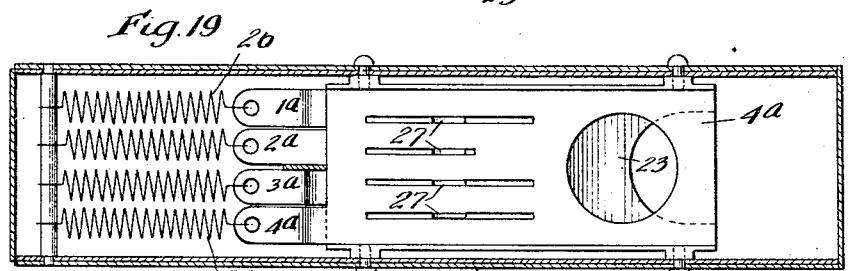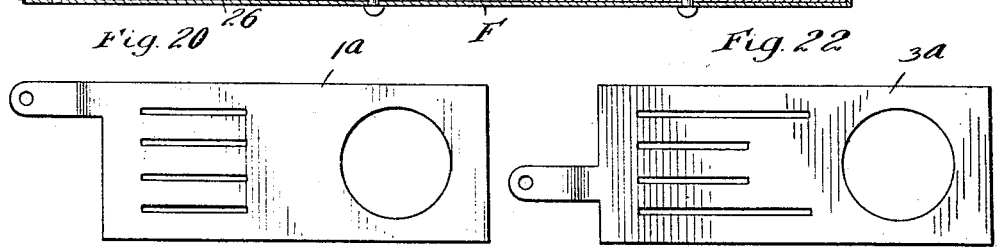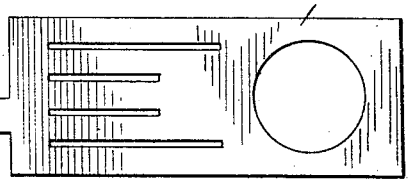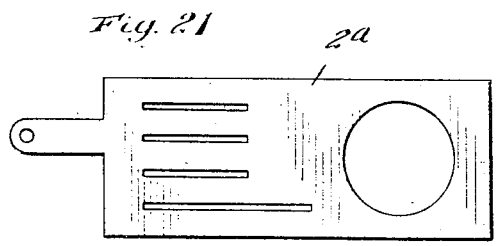

UNITED STATES PATENT OFFICE.

WILLIAM P. DUN LANY, OF MAYWOOD, ILLINOIS, ASSIGNOR TO CHARLES W. SHONK COMPANY, OF CHICAGO, ILLINOIS, A CORPORATION OF ILLINOIS.

COIN-CHANGE-MAKING MACHINE.

1,284,619.     Specification of Letters Patent.     Patented Nov. 12, 1918.

Application filed July 18, 1913. Serial No. 779,663.

*To all whom it may concern:*

Be it known that I, WILLIAM P. DUN LANY, a citizen of the United States, residing in Maywood, in the county of Cook and State of Illinois, have invented a new and useful Improvement in Coin-Change-Making Machines, of which the following is a specification.

This invention relates to improvements in coin change-making machines.

One object of the invention is to provide a coin change-making machine which is cheap in first cost; is composed of relatively few parts simply arranged; and which is adapted to have most of its parts stamped up from sheet metal.

Another object of the invention is to provide a change-making machine which has automatically-operated devices for locking the parts when any of the coin reservoirs are empty and there are not enough coins to make the desired amount of change.

Another object of the invention is to provide a coin change-making machine having an attachment for giving the desired amounts of change in pennies.

The invention furthermore consists in the improvements of the parts and devices and in the novel combinations of the parts and devices as herein shown, described and claimed.

Figure 5:
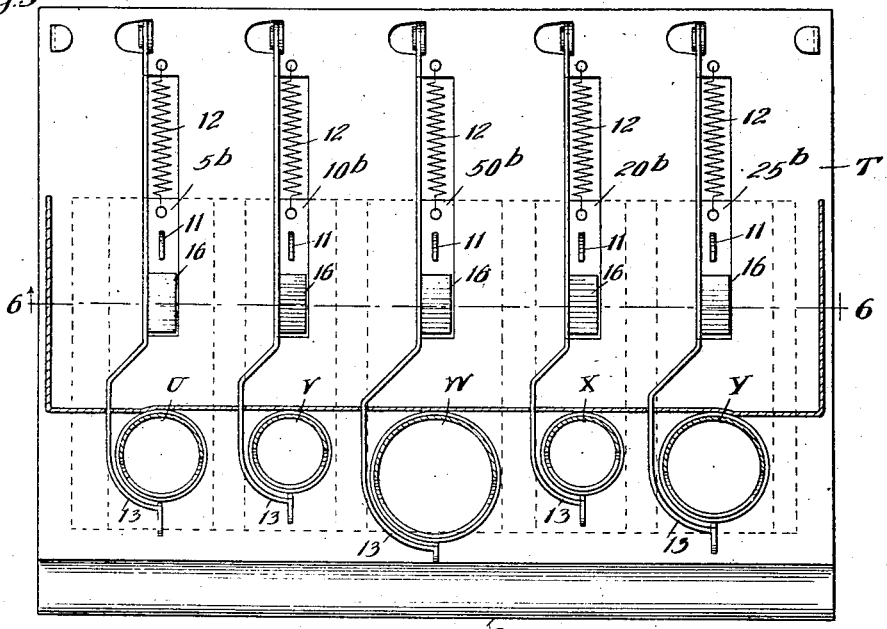
Figure 6:
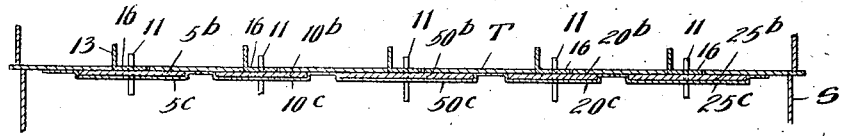
Figure 7:
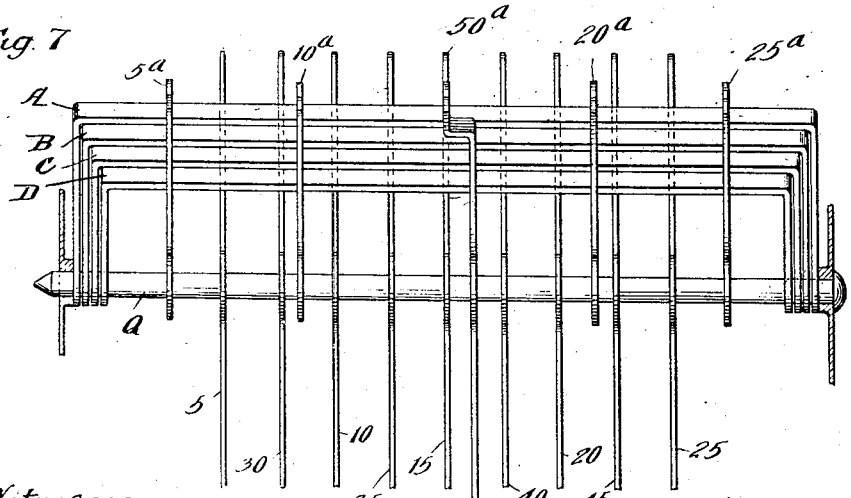

In the drawing forming a part of this specification, Figure 1 is a top plan view of a machine embodying my improvements. Fig. 2 is a front elevation of the structure shown in Fig. 1. Fig. 3 is a transverse, vertical section taken substantially on the line 3—3 of Fig. 1. Fig. 4 is a similar section taken on the line 4—4 of Fig. 1. Fig. 5 is a sectional view taken substantially on the line 5—5 of Fig. 3. Fig. 6 is a sectional view taken substantially on the line 6—6 of Fig. 5. Fig. 7 is a detail, part plan, part section, of parts within the casing of the machine. Figs. 8 to 15, inclusive, are detail views of the various keys or levers, including those for obtaining change in amounts varying in steps of five cents from 10¢ to 45¢. Figs. 16 and 17 are detail views of actuating-slide levers which coöperate with the 20¢ and 25¢ keys, respectively. Fig. 18 is a detail sectional view taken substantially on the line 18—18 of Fig. 1 and shows more particularly the penny change-making device. Fig. 19 is a sectional view taken substantially on the line 19—19 of Fig. 18, and Figs. 20 to 22, inclusive, are detail views of three of the penny ejecting-slides.

In said drawing the machine, as shown, includes a suitable casing or shell S adapted to support the various parts of the mechanism and having an inclined shelf or table T. The casing or shell S is also provided with a plurality of coin reservoirs U, V, W, X and Y adapted to hold stacks of nickles, dimes, fifty-cent pieces, dimes and quarters, respectively, said reservoirs being slightly inclined from the vertical and open on their front sides to thereby facilitate the insertion therewithin of stacks of coins as will be understood. Within the shell at the front thereof and extending longitudinally, is an inclined chute Z, down which the coins, when ejected from the reservoirs, as hereinafter described, fall and are delivered to the operator on a shelf R. From the preceding description it will be understood that the penny change-making attachment is not included, inasmuch as the same will be hereinafter separately described.

Mounted in the shell and extending longitudinally thereof is a shaft Q on which are pivotally mounted a plurality of actuating keys or levers 5, 10, 15, 20, 25, 30, 35, 40, 45 and 50 corresponding, respectively, to the amounts of change which is delivered when said keys are operated or depressed. Each of said actuating keys or levers, as most clearly shown in Figs. 3 and 4, is provided with a substantially U-shaped portion on the forward side of the shaft Q, the free ends of the U-shaped portions being provided with suitable finger keys or buttons having the proper amounts designated thereon. Each of said actuating keys or levers 5, 10, 15, 20, 25, 30, 35, 40 and 45, at the rear of the shaft Q, is provided with a notched yoke-lifting or actuating portion as will be hereinafter more particularly described. The actuating key or lever 50 differs from the other keys, in that it operates its corresponding coin ejecting-slide directly and does not operate any of the yokes about to be described.

Also pivotally mounted on the shaft Q and extending rearwardly therefrom are four yokes or bars A, B, C and D, so arranged that when in normal position they nest one within the other, as shown more particularly in Figs. 3 and 7. Also pivotally mounted on the shaft Q above the yokes A, B, C and D are four ejecting-slide operating levers 5ª, 10ª, 20ª, and 25ª, said ejecting-slide operating levers coöperating, respectively, with the actuating keys 5, 10, 15 and 20, and 25. The actuating key or lever 50 for ejecting a fifty-cent piece is provided with an integral ejecting-slide operating lever 50ª, see Fig. 3. Each of the ejecting-slide operating levers 5ª, 10ª, 20ª, 25ª, and 50ª is provided with a lug or projection 11 which engages in a slot formed in the corresponding ejecting-slides 5ᵇ, 10ᵇ, 20ᵇ, 25ᵇ and 50ᵇ. These ejecting-slides are reciprocatingly mounted in suitable guideways 5ᶜ, 10ᶜ, 20ᶜ, 25ᶜ and 50ᶜ, respectively, see Fig. 6, and at their front ends are each provided with an arcuate recess for engaging the lower-most coin of the coin reservoir with which it coöperates and, as will be understood, the thicknesses of these ejecting-slides approximate the thicknesses of the respective coins to be ejected. As shown in Fig. 4, the stacks of coins rest upon the plates forming the guide-ways 5ᶜ, 10ᶜ, etc., the latter being also provided with arcuate recesses at their forward ends a short distance in front of the stacks of coins so that when the lower-most coins of the stacks are separated or removed from the bottom of the stacks and pushed forward they will drop therethrough into the chute Z. Each ejecting-slide is normally held retracted or in its rear-most position by a retracting spring 12 suitably attached at one end to a fixed part of the shell or casing.

In order to prevent an incorrect amount of change to be delivered when a key is pressed should any of the coin reservoirs be empty, there are provided a plurality of pivoted levers 13, one for each reservoir and each having at its forward end in front of its corresponding reservoir, a depending cam 14, see Fig. 4, which lies in the path of the lower-most coin of the stack. When the corresponding ejecting-slide is advanced and there is a coin in the reservoir the latter will engage the cam 14 and thereby lift the lever 13. This operation in turn lifts a stop or flange 16 which normally lies in the path of the corresponding projection 11. When no coin is present in the reservoir from which a coin ought to be ejected to make the proper change, the corresponding lever 13 will not be operated and a full movement of the ejecting-slide operating levers will be prevented, thus automatically locking the machine and preventing a false amount of change being delivered.

I will now describe the means for selecting the proper ejecting-slide operating levers when any of the keys 5, 10, 15, 20, 25, 30, 35, 40 or 45 are operated. Referring now to Fig. 4, it will be seen that the rear portion of the actuating key or lever 5 is provided with a cut-out portion 5ᵈ which is of sufficient width to escape the yokes B, C and D when the key 5 is depressed, but a depression of the key 5 will lift the yoke A, which in turn engages the actuating lever 5ª and thereby operates the ejecting-slide 5ᵇ. It will also be noticed that the ejecting-slide actuating lever 5ª is provided with a cut-out portion 5ᵉ of sufficient size to permit upward movement of the yokes B, C and D without the lever 5ª being affected thereby. In like manner the rear portion of the actuating key or lever 10 is provided with two notches 10ᵈ which provide clearance for the yokes A, C and D when the key 10 is depressed, but the yoke B will be engaged and lifted, which in turn will engage and operate the ejecting-slide actuating lever 10ª which is provided with a projection 10ᵉ resting upon the yoke B, see Fig. 4. The lever 10ª is also provided with recess or cut-out portions to provide clearance for the yokes A, C and D whenever the latter are actuated. From the preceding description it will be seen that when the key 10 is depressed, the ejecting-slide 10ᶜ will be operated thereby ejecting or cutting out a ten-cent piece from the stack of coins in the reservoir V. The key lever 15 is provided with two cut-out portions 15ᵈ arranged to clear or pass by the yokes B and D so that when the key 15 is depressed the yokes A and C will be shifted, thereby operating the levers 5ª and 20ª and causing the cutting out of a nickel from the stack in the reservoir U and a dime from the stack of coins in the reservoir X, it being understood that the ejecting-slide actuating lever 20ª, see Fig. 16, is provided with recess or cut-out portions 20ᵉ so located that the same is not operated by a movement of any of the yokes A, B or D. When the key 20 is depressed the rear portion thereof will lift the yokes B and C, thereby operating the ejecting-slide actuating levers 10ª and 20ª, and, as will be understood, the rear portion of the key 20 is provided with recesses or cut-out portions 20ᵈ which clear the yokes A and D to thereby prevent operation of the latter. When the key 25 is depressed, the rear end thereof will engage and lift the yoke D only, which in turn will operate the ejecting-slide actuating lever 25ª, see Fig. 17, the latter in turn actuating slide 25ᵇ to thereby eject a twenty-five cent piece from the reservoir Y.

In order to obtain thirty cents in change, the rear portion of the key 30 is so designed that it will engage and lift the yokes A and D, thereby causing the cutting out of a five cent piece and a twenty-five cent piece. The rear portion of the key 35 is arranged to operate the yokes B and D, thereby ejecting a ten cent piece from the bottom of the stack in the reservoir V and a twenty-five cent piece from the stack of coins in the reservoir Y. The rear portion of the key 40, when raised, engages the yokes A, B and D, thereby cutting out a five cent piece, a ten cent piece and a twenty-five cent piece, and the rear portion of the key 45, when raised, engages the yokes B, C and D, thus cutting out two ten cent pieces and a twenty-five cent piece. For obtaining fifty cents in change the rear portion 50$^a$ of the key 50, which is formed integral therewith, engages directly the ejecting-slide 50$^b$ and no movement of any of the yokes A, B, C or D takes place. For obtaining amounts of change varying from fifty-five cents to ninety-five cents by steps of five cents, the key 50 will always be operated in conjunction with the corresponding key 5, 10, 15, 20, 25, 30, 35, 40 or 45 in accordance with the amount of change desired. As for instance, when sixty cents change is desired the keys 50 and 10 will be depressed, and for seventy-five cents the keys 50 and 25.

It will thus be seen that the finger key levers and ejecting levers are of key-like form on their opposing surfaces or edges, being variously provided with operating surfaces and inoperative escape recesses or cut-out portions, and constituting a simple means, eliminating much complication of mechanism, for ejecting coins in various combinations.

For obtaining change in pennies in amounts varying from one to four cents, the attachment F is provided, which, as shown more particularly in Figs. 1, 2 and 18 to 22 inclusive, comprises a shell or casing 21 having a reservoir 22 for holding a stack of pennies, the construction and arrangement of the reservoir 22 being similar to those for the 5, 10, 25 and 50¢ pieces. As shown in Fig. 18, the stack of pennies is adapted to rest on a plate 23 on which are mounted four slides, 1$^a$, 2$^a$, 3$^a$ and 4$^a$, the latter being actuated directly by actuating levers or keys 1, 2, 3 and 4, respectively. As will be understood, each ejecting-slide 1$^a$, 2$^a$, 3$^a$ and 4$^a$ corresponds in thickness to the thickness of a penny or cent piece so that a movement of the lower-most slide 1$^a$ will cut out one penny, a movement of the slide 2$^a$ will cut out two pennies, etc. Each of the ejecting-slides 1$^a$, 2$^a$, 3$^a$ and 4$^a$ is provided with a retracting spring 26 to normally hold the slides in their rear-most position. Each of the actuating keys or levers 1, 2, 3 and 4 is provided with a projection 27 which engages in slots formed in the ejecting-slides; the slots being so arranged in the different slides that a movement of the key 1 will only operate the slide 1$^a$, a movement of the key 2 will operate the slides 1$^a$ and 2$^a$; the key 3 will operate the slides 1$^a$, 2$^a$ and 3$^a$; and the key 4 will operate all four slides 1$^a$, 2$^a$, 3$^a$ and 4$^a$. The pennies, as ejected, will fall onto an inclined chute 28 which directs the coins into the main chute Z so that the pennies will be delivered onto the table R. The penny change-making device F is readily attached to the shell or casing S by means of screws or other suitable devices 29.

From the preceding description it will be seen that I have provided a coin change-making machine of relatively simple construction, composed of few parts and adapted to make change in any amounts varying from one cent to ninety-nine cents, and having also automatically operated means for preventing an incorrect amount of change being delivered which does not include pennies.

Although I have herein shown and described what I now consider the preferred embodiment of my improvements, yet it will be understood that various changes and modifications may be made in the details of construction and arrangement of parts without departing from the spirit of my invention, and all such changes and modifications are contemplated as fall within the scope of the claims appended hereto.

I claim:

1. In a change making machine, in combination: coin reservoirs for holding coins of various denominations; coin ejecting means for the said reservoirs including ejecting levers; finger key levers; and independent movable parts or yokes intermediate of the finger key levers and the ejecting levers, and acting to transmit movement from some of the former to some of the latter; both the finger key levers and the ejecting levers being variously cut out on their faces which oppose the yokes to escape operation of and by some of the said yokes, and the yokes being uniformly plane on their operating faces.

2. In a change making machine, in combination: coin reservoirs for holding coins of various denominations; coin ejecting means for the said reservoirs including ejecting levers; finger key levers; and independent movable parts or yokes intermediate of the finger key levers and the ejecting levers and having plane and uniform edges, and acting to transmit movement from some of the former to some of the latter; both the finger key levers and the ejecting levers having key-like faces opposing the plane edges of the yokes, variously formed with operating surfaces and escape recesses or cut-out portions coöperating as described with the said independent movable yokes.

3. In a change making machine, in combination: coin reservoirs for holding coins of various denominations; coin ejecting means for the said reservoirs including ejecting levers; finger key levers; independent movable parts or yokes intermediate of the finger key levers and the ejecting levers, and acting to transmit movement from some of the former to some of the latter; both the finger key levers and the ejecting levers having key-like opposing faces, variously formed with operating surfaces and escape recesses or cut out portions coöperating as described with the said independent movable parts; cams arranged on those sides of the coin reservoirs toward which the coins are ejected and adapted to be moved by the coin; stops arranged to arrest the ejecting levers; and means whereby the said cams remove the stops from their arresting positions when a coin is ejected.

4. In a change making machine, in combination: coin reservoirs for holding coins of various denominations; coin ejecting means for the said reservoirs including ejecting levers; finger key levers; independent movable parts intermediate of the finger key levers and the ejecting levers and acting to transmit movement from some of the former to some of the latter; both the finger key levers and the ejecting levers having key-like opposing faces, variously formed with operating surfaces and escape recesses or cut out portions coöperating as described with the said independent movable parts; and a transverse shaft on which the said ejecting levers, finger key levers and independent movable parts are pivoted.

5. In a change making machine, in combination: coin reservoirs for holding coins of various denominations; coin ejecting means for the said reservoirs including ejecting levers; finger key levers; independent movable parts intermediate of the finger key levers and the ejecting levers and acting to transmit movement from some of the former to some of the latter; both the finger key levers and the ejecting levers having key-like opposing faces, variously formed with operating surfaces and escape recesses or cut out portions coöperating as described with the said independent movable parts; a transverse shaft on which the said ejecting levers, finger key levers and independent movable parts are pivoted; cams arranged on those sides of the coin reservoirs toward which the coins are ejected and adapted to be moved by the coin; stops arranged to arrest the ejecting levers; and means whereby the said cams remove the stops from their arresting positions when a coin is ejected.

6. In a change making machine, in combination; coin reservoirs for holding coins of various denominations; coin ejecting means for the said reservoirs including ejecting levers; finger key levers; independent movable parts or yokes intermediate of the finger key levers and the ejecting levers and acting to transmit movement from some of the former to some of the latter; both the finger key levers and the ejecting levers having key-like faces, variously formed with operating surfaces and escape recesses or cut out portions coöperating as described with the said independent movable parts; cams arranged on those sides of the coin reservoirs toward which the coins are ejected and adapted to be moved by the coin; stops arranged to arrest the ejecting levers; and levers extending past the reservoirs and carrying the said stops, whereby the said cams remove the stops from their arresting positions when a coin is ejected.

7. In a change making machine, in combination: coin reservoirs for holding coins of various denominations; coin ejecting means for the said reservoirs including ejecting levers; finger key levers; and independent movable parts or yokes intermediate of the finger key levers and the ejecting levers, and acting to transmit movement from some of the former to some of the latter; both the finger key levers and the ejecting levers being variously cut out on their faces which oppose the yokes to escape operation of and by some of the said yokes.

8. In a change making machine, in combination: coin reservoirs for holding coins of various denominations; coin ejecting means for the said reservoirs including ejecting levers; finger key levers; independent movable parts intermediate of the finger key levers and the ejecting levers and coöperating with both of said opposing sets of levers and acting to transmit movement from some of the former to some of the latter; certain of said parts having key-like opposing faces, variously formed with operating surfaces and escape recesses of cut out portions coöperating as described with the said independent movable parts; and a transverse shaft on which the said ejecting levers, finger key levers and independent movable parts are pivoted.

9. In a change making machine, in combination: coin reservoirs for holding coins of various denominations; coin ejecting means for the said reservoirs; finger key levers; operating connections between the key levers and the said ejecting means; cams arranged on those sides of the coin reservoirs toward which the coins are ejected, and adapted to be moved by the coin; stops arranged to arrest the ejecting levers; and means whereby the said cams remove the stops from their arresting positions when a coin is ejected.

WILLIAM P. DUN LANY.

Witnesses:
WILLIAM A. GEIGER,
JOSEPH HARRIS.

Copies of this patent may be obtained for five cents each, by addressing the "Commissioner of Patents, Washington, D. C."